C. O. JOHNSON.
MEAT TENDERER.
APPLICATION FILED APR. 21, 1921.
1,391,119. Patented Sept. 20, 1921.
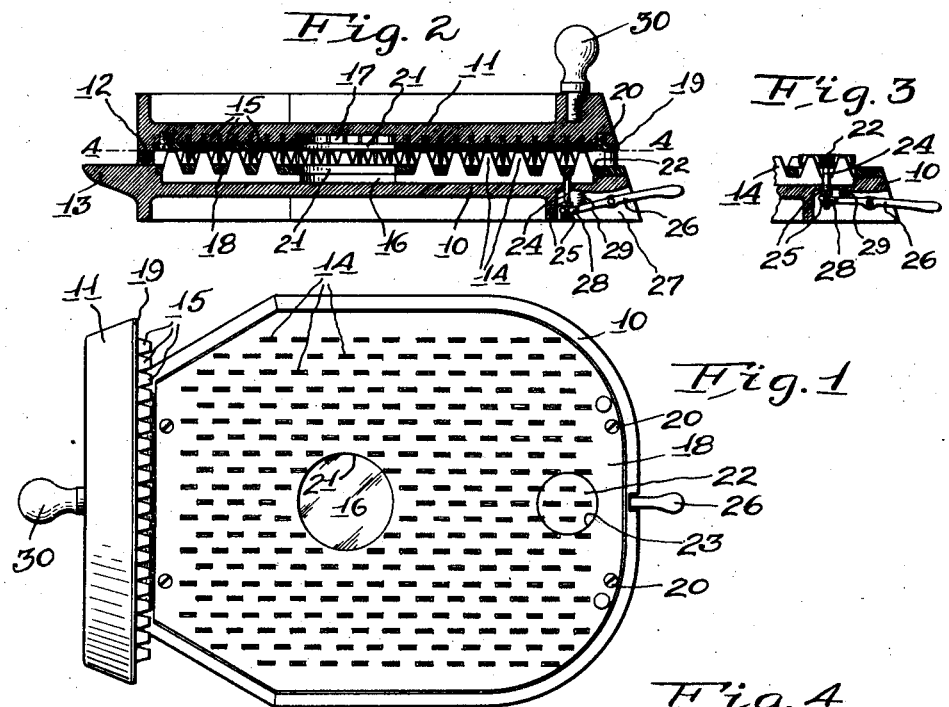
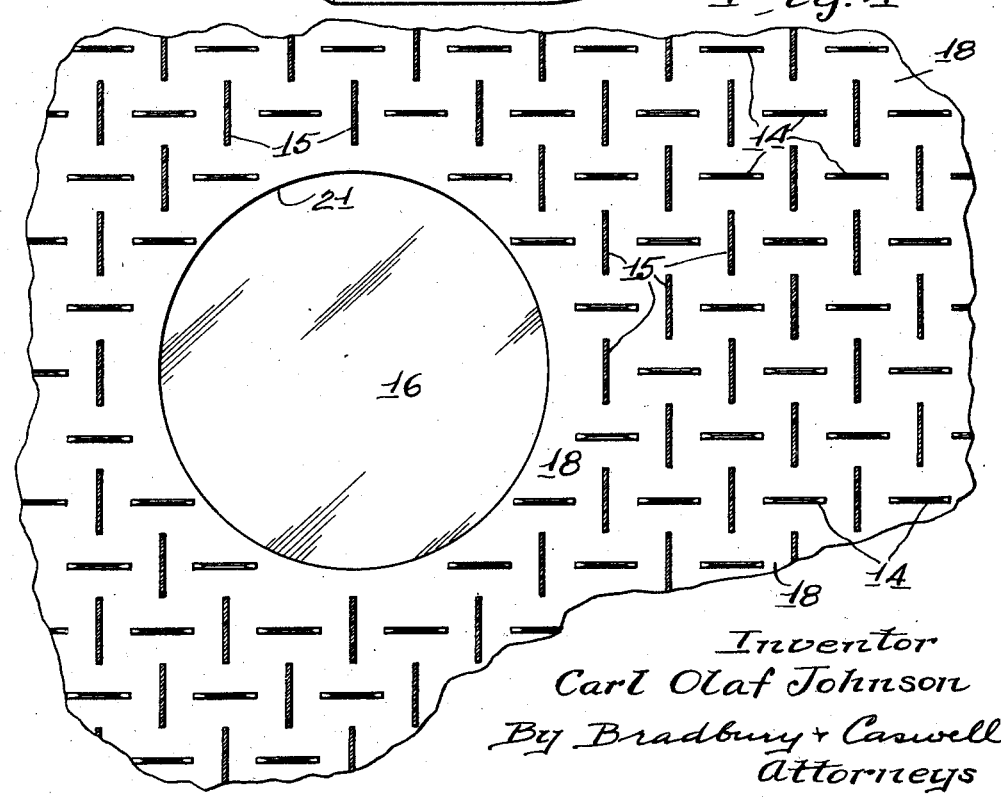
Inventor
Carl Olaf Johnson
By Bradbury + Caswell
Attorneys

UNITED STATES PATENT OFFICE.

CARL OLAF JOHNSON, OF ST. PAUL, MINNESOTA.

MEAT-TENDERER.

1,391,119.  Specification of Letters Patent.  Patented Sept. 20, 1921.

Application filed April 21, 1921. Serial No. 463,117.

*To all whom it may concern:*

Be it known that I, CARL OLAF JOHNSON, a subject of the King of Sweden, residing at St. Paul, in the county of Ramsey and State of Minnesota, have invented a new and useful Meat-Tenderer, of which the following is a specification.

My invention relates to improvements in meat tendering devices, its object being to supply a simple, durable and inexpensive means for quickly and easily operating upon meats to enhance the edibility thereof and thereby encourage the more frequent use of the less expensive cuts.

More specifically, it is my object to provide a device of this kind designed in one operation to sever, in numerous places and at different angles, the muscles and sinews of a piece of meat.

A further object is to supply a device of this kind adapted to operate upon a piece of meat such as a round steak, the coöperating elements of the device being designed to accommodate the usual bone in the steak.

A further object is to provide a device of this nature, which is readily cleansed and easily maintained in sanitary condition.

Another object is to provide such a device with means for lifting an edge of a slice of meat operated upon, whereby the user may easily grasp the prepared meat.

In the drawings, Figure 1 is a plan view of a device embodying my invention, the block being elevated as is the case preparatory to applying meat to the base or removing the same therefrom; Fig. 2 is a longitudinal, central, sectional view of said device; Fig. 3 is a fragmentary, sectional view, in detail, taken on the same line as Fig. 2, and Fig. 4 is an enlarged sectional view, in detail, taken on the line 4—4 of Fig. 1.

Referring to the drawings, I have used the reference numerals 10 and 11 to indicate respectively the base and block of my improved device. These members are preferably formed from suitable light metal and are joined at their rear edges by a hinge 12, the base being supplied with a rest 13 to hold the block 10 against tipping backward when the same is erected to give access to the base. The base 10 is grooved longitudinally to receive cutters formed with upwardly projecting blades 14, while the block 11 is grooved transversely to receive similar cutters 15 thereon, said blades 14 and 15 being arranged to clear each other when the block 11 is lowered to cutting position shown in Fig. 2. Said base 10 and block 11 are respectively formed with depressions 16 and 17 therein, which depressions register, one with the other, when said block is lowered. In many cuts of meat, and particularly in round steaks, for which the present device is particularly though not exclusively adapted, a single round bone is found in each slice. A cut of meat is so placed upon the blades 14 of the base that the bone therein rests over the depression 16. The companion depression 17 in the block 11 is arranged, as above explained, to register with the depression 16 and said depressions receive the bone, when the blades of the base 10 and block 11 are caused to penetrate the meat, by swinging the block 11 downward against the base, as shown in Fig. 2.

To provide for cutting through a piece of meat without injuring the cutting edges of the blades 14 and 15 and to further provide for cleansing the device, I supply a pair of cutting plates 18 and 19 of wood, fiber or other suitable material, said plates being detachably secured in suitable manner to said base 10 and block 11 respectively, as by means of screws 20. These plates are perforated to receive the blades 14 and 15 and have apertures 21 therein registering with the depressions 16 and 17 in the base 10 and block 11. The removable feature of said plates permits the same to be detached and immersed in hot water or subjected to steam blasts.

In practice, it is found that a treated cut of meat will adhere to the base 10 and to aid the user in obtaining a hold upon the meat, I have supplied means for lifting the edge of a cut of meat, whereby the same may be readily grasped. A lifter head 22, fitting snugly within an aperture 23 in the cutting plate 18 of the base 10, is carried upon a stem 24 slidable vertically in said base. The lower end of said stem 24 is threaded and fitted with spaced nuts 25. A lever 26, pivoted medially on the base within a recess 27 therein, is formed with a yoke 28 at its inner end, the outer end of said lever projecting beyond the margin of base (Figs. 2 and 3). The yoke 28 embraces the stem 24 between the nuts 25 and thus connects said lever 26 and stem 24. Downward pressure upon the outer end of the lever 26 results in elevating the lifter head 22, the extent of such elevation depending upon the adjustment of the nuts 25 on the stem 24. A compression spring 29, interposed between the base 10 and the inner end of the lever 26, provides for automatically depressing the lifter head 22 when the outer end of the lever 26 has been released. A knob or handle 30 on the block 11 supplies a grip for swinging said block downward against a cut of meat and upward therefrom.

Changes in the specific form of my invention, as herein disclosed, may be made within the scope of what is claimed, without departing from the spirit of my invention.

Having described my invention, what I claim as new and desire to secure by Letters Patent is:

1. In a device of the class described, a pair of cutter members, one comprising a base having cutter blades thereon, the other comprising a block also having cutter blades thereon, said block being movable with respect to said base to permit the placing of a piece of meat upon the latter and to bring the cutter blades of said block into coöperation with the cutter blades of the base, said blades being adapted to sever, from opposite sides, the muscles and sinews of meat struck between said cutter members, and cutting plates removably attached to said base and block for the purposes specified.

2. In a device of the class described, a pair of cutter members, one comprising a base having cutter blades thereon, the other comprising a block also having cutter blades thereon, said block being movable with respect to said base to permit the placing of a piece of meat upon the latter and to bring the cutter blades of said block into coöperation with the cutter blades of the base, said blades being adapted to sever, from opposite sides, the muscles and sinews of meat struck between said cutter members, and means on the base for lifting a piece of meat thereon, whereby the meat may be conveniently grasped and removed from the device after the cutting operation.

3. In a device of the class described, a base having a depression therein, cutter blades on said base, a block having a depression therein adapted to register with the depression in the base, and cutter blades on the block, said block being movable with respect to said base to permit the placing of a piece of meat upon the latter and to bring the cutter blades thereon into coöperation with the cutter blades of the base, said depressions being adapted to receive the bone in a piece of meat and said blades being adapted to sever, from opposite sides, the muscles and sinews of the meat struck between said base and block.

4. In a device of the class described, a pair of coöperating cutter members, one member being movable with respect to the other to permit the insertion of a piece of meat therebetween, also to cause the cutting of the meat and, further, to permit the removal of the treated meat therefrom, said members being supplied with registering depressions in their adjacent cutting faces to receive bones in the meat during the cutting operation.

5. In a device of the class described, a pair of coöperating cutter members, one comprising a base and the other a block, the latter being movable with respect to the former to permit the placing of a piece of meat upon the block and the removal of the meat from said block and a lifter incorporated in the base and adapted to elevate an edge of a piece of treated meat, whereby the user may readily grasp the same.

6. In a device of the class described, a pair of relatively movable members, one having rows of spaced cutter blades projecting from its cutting face, the other having similar cutter blades projecting from its cutting face, said latter blades being angularly arranged with respect to said first mentioned blades and adapted to nest between the same, both sets of blades being designed to engage the opposite cutting faces of said members at the extremity of movement in the cutting operation, whereby a piece of meat placed between said members may be cut through in numerous places from both sides and at different angles.

In testimony whereof, I have signed my name to this specification.

CARL OLAF JOHNSON.